United States Patent
Liu et al.

(10) Patent No.: US 11,321,812 B2
(45) Date of Patent: May 3, 2022

(54) DISPLAY METHOD, DISPLAY DEVICE, VIRTUAL REALITY DISPLAY DEVICE, VIRTUAL REALITY DEVICE, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Bingxin Liu, Beijing (CN); Ziqiang Guo, Beijing (CN); Jian Sun, Beijing (CN); Feng Zi, Beijing (CN); Binhua Sun, Beijing (CN); Lin Lin, Beijing (CN); Yakun Wang, Beijing (CN); Jiyang Shao, Beijing (CN); Yadong Ding, Beijing (CN); Qingwen Fan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/768,117

(22) PCT Filed: Nov. 12, 2019

(86) PCT No.: PCT/CN2019/117395
§ 371 (c)(1),
(2) Date: May 29, 2020

(87) PCT Pub. No.: WO2020/098624
PCT Pub. Date: May 22, 2020

(65) Prior Publication Data
US 2020/0302573 A1 Sep. 24, 2020

(30) Foreign Application Priority Data

Nov. 16, 2018 (CN) .......................... 201811374101.X

(51) Int. Cl.
*G06T 3/40* (2006.01)
*G06T 7/11* (2017.01)
*G06T 7/90* (2017.01)

(52) U.S. Cl.
CPC ............... *G06T 3/40* (2013.01); *G06T 7/11* (2017.01); *G06T 7/90* (2017.01)

(58) Field of Classification Search
CPC ..................................................... G09G 3/003
See application file for complete search history.

(56) References Cited

U.S. PATENT DOCUMENTS 6,006,226 A * 12/1999 Cullen ............... G06F 16/5838
382/232
6,917,711 B1 * 7/2005 Wang ................... H04N 19/60
382/232
(Continued)

FOREIGN PATENT DOCUMENTS

CN 101163245 A 4/2008
CN 101923823 A 12/2010
(Continued)

OTHER PUBLICATIONS

International search report of PCT application No. PCT/CN2019/117395 dated Feb. 18, 2020.
(Continued)

*Primary Examiner* — Phi Hoang
(74) *Attorney, Agent, or Firm* — Fay Sharpe LLP

(57) ABSTRACT

Disclosed are a display method, a display device, a virtual reality display device, a virtual reality device, and a storage medium. The display method includes: segmenting one frame of image into at least one image region; determining
(Continued)

grayscale information of the image region; determining a resolution compression ratio of the image region according to the grayscale information of the image region, wherein a grayscale level of the image region is negatively correlated with the resolution compression ratio; and displaying an image in the image region according to the resolution compression ratio of each image region.

15 Claims, 3 Drawing Sheets

(56) References Cited

U.S. PATENT DOCUMENTS

| | | | |
|---|---|---|---|
| 2013/0271621 A1 | 10/2013 | Lee et al. | |
| 2014/0085276 A1* | 3/2014 | Jang | G09G 3/20 345/204 |
| 2015/0009228 A1* | 1/2015 | Chen | G09G 5/10 345/601 |
| 2016/0253781 A1 | 9/2016 | Jin | |
| 2017/0110065 A1* | 4/2017 | Zhang | G09G 3/2018 |
| 2018/0082410 A1* | 3/2018 | Schulte | G06T 7/75 |
| 2018/0084180 A1* | 3/2018 | Kim | G06T 5/007 |
| 2019/0026876 A1* | 1/2019 | Coleman | G06K 9/38 |
| 2019/0236757 A1 | 8/2019 | Wang | |
| 2020/0242742 A1* | 7/2020 | Pouli | G09G 5/10 |

FOREIGN PATENT DOCUMENTS

| | | |
|---|---|---|
| CN | 103379275 A | 10/2013 |
| CN | 104240213 A | 12/2014 |
| CN | 105654424 A | 6/2016 |
| CN | 106713918 A | 5/2017 |
| CN | 107153519 A | 9/2017 |
| CN | 107195278 A | 9/2017 |
| CN | 107820097 A | 3/2018 |
| CN | 109472874 A | 3/2019 |
| JP | 2006270405 A | 10/2006 |

OTHER PUBLICATIONS

First office action of Chinese application No. 201811374101.X dated Mar. 26, 2020.
Bin Yu, et al; Image processing based on MATLAB and genetic algorithm; Sep. 30, 2015, pp. 12-14.
Ping Wang, Analysis of Image File Compression Algorithm; Consume Guide; May 8, 2009, pp. 199-200.
Second office action of Chinese application No. 201811374101.X dated Jan. 6, 2021.

* cited by examiner

DISPLAY METHOD, DISPLAY DEVICE, VIRTUAL REALITY DISPLAY DEVICE, VIRTUAL REALITY DEVICE, AND STORAGE MEDIUM

CROSS-REFERENCE TO RELATED APPLICATION

This application is a 371 of PCT Application No. PCT/CN2019/117395, filed on Nov. 12, 2019, which claims priority to Chinese Patent Application No. 201811374101.X, filed on Nov. 16, 2018 and entitled "DISPLAY METHOD, DISPLAY DEVICE, VIRTUAL REALITY DISPLAY DEVICE, VIRTUAL REALITY DEVICE, AND STORAGE MEDIUM", the entire contents of which are incorporated by reference herein.

TECHNICAL FIELD

The present disclosure generally relates to the field of display, more particularly, relates to a display method, a display device, a virtual reality display device, a virtual reality device, and a storage medium.

BACKGROUND

A virtual reality (VR) device creates an immersive feeling for users based on its powerful resources and display capabilities, but contradiction between data volume and bandwidth is increasingly prominent with continuous improvement of resolution. When experiencing high-definition resources, the users are subject to undesired experience, such as excessive delays, lags in pictures and the like, because of the excessive data volume.

SUMMARY

The present disclosure provides a display method, a display device, a virtual reality display device, a virtual reality display apparatus and a storage medium.

At least one embodiment of the present disclosure provides a display method. The method includes:

segmenting one frame of image into at least one image region;

determining grayscale information of the image region for the image region;

determining a resolution compression ratio of the image region according to the grayscale information of the image region, wherein a grayscale level of the image region is negatively correlated with the resolution compression ratio; and displaying an image of the image region according to the resolution compression ratio of the image region.

Optionally, determining the grayscale information of the image region for the image region includes:

determining a grayscale level of each pixel point based on a grayscale level and a weight of each channel of a pixel point in the image region; and determining an average grayscale level of the image region as the grayscale information of the image region according to the grayscale level of each pixel point.

Optionally, determining the grayscale information of the image region for the image region includes:

determining a grayscale level of each pixel point based on a grayscale level and a weight of each channel of a pixel point in the image region of each channel; and taking a highest grayscale level in the grayscale levels of the pixel points as the grayscale information of the image region.

Optionally, determining the resolution compression ratio of the image region according to the grayscale information of the image region includes:

determining a grayscale grade of the image region according to the grayscale information; and determining a resolution compression ratio corresponding to the grayscale grade of the image region according to a relationship between the grayscale grade and the resolution compression ratio.

Optionally, each grayscale grade corresponds to a plurality of consecutive grayscale levels.

Optionally, displaying the image of the image region according to the resolution compression ratio of the image region includes:

at a display stage, outputting display data corresponding to the resolution compression ratio of the image region to pixel units in each column corresponding to the image region when pixel units in each row corresponding to the image region are scanned.

Optionally, outputting the display data corresponding to the resolution compression ratio of the image region to the pixel units in each column corresponding to the image region includes:

outputting the same display data to pixel units in at least two adjacent columns corresponding to the image region, wherein a higher grayscale of the image region indicates a smaller number of columns of the pixel units outputting the same display data.

Optionally, segmenting the one frame of image into the at least one image region includes:

segmenting one frame of image into a plurality of regions equidistantly according to rows and columns, wherein the plurality of regions are arranged in an array.

At least one embodiment of the present disclosure provides a display device. The device includes:

an image segmenting unit, configured to segment one frame of image into at least one image region;

a grayscale determining unit, configured to determine grayscale information of the image region;

a compression ratio determining unit, configured to determine a resolution compression ratio of the image region according to the grayscale information of the image region, wherein a grayscale level of the image region is negatively correlated with the resolution compression ratio; and a display unit, configured to display an image of the image region according to the resolution compression ratio of the image region.

Optionally, the grayscale determining unit includes:

a pixel point grayscale determining sub-unit, configured to determine a grayscale level of each pixel point based on a grayscale level and a weight of each channel of a pixel point in the image region; and an average grayscale determining sub-unit, configured to determine an average grayscale level of the image region as grayscale information of the image region according to the grayscale level of each pixel point.

Optionally, the grayscale determining unit includes:

a pixel point determining sub-unit, configured to determine a grayscale level and a weight of each pixel point based on a grayscale level of each channel of a pixel point in the image region; and a highest grayscale determining sub-unit, configured to take a highest grayscale level in the grayscale levels of the pixel points as the grayscale information of the image region.

Optionally, the compression ratio determining unit includes:

a grayscale grade determining sub-unit, configure to determine a grayscale grade of the image region according to the grayscale information; and a resolution compression ratio determining sub-unit, configured to determine a resolution compression ratio corresponding to the grayscale grade of the image region according to a relationship between the grayscale grade and the resolution compression ratio.

Optionally, each grayscale grade corresponds to a plurality of consecutive grayscale levels, and grayscale levels corresponding to all the grayscale grades include all the grayscale levels.

Optionally, the display unit includes:

a display output sub-unit, configure to, at a display stage, output display data corresponding to the resolution compression ratio of the image region to pixel units in each column corresponding to the image region when pixel units in each row corresponding to the image region are scanned.

Optionally, the display output sub-unit is configured to output the same display data to pixel units in at least two adjacent columns corresponding to the image region, wherein a higher grayscale of the image region indicates a smaller number of columns of the pixel units outputting the same display data.

Optionally, the image segmenting unit includes:

an uniform segmenting sub-unit, configured to segment one frame of image into a plurality of regions equidistantly according to rows and columns, wherein the plurality of regions are arranged in an array.

At least one embodiment of the present disclosure provides a virtual reality display device. The virtual reality display device includes the display device as define in the embodiment of the present disclosure.

At least one embodiment of the present disclosure provides a virtual reality device. The virtual reality device includes a processor; and a memory configured to store at least one computer instruction, wherein the processor is configured to perform the display method as defined in the above embodiment when executing the at least one computer instruction.

At least one embodiment of the present disclosure provides a computer-readable storage medium storing at least one computer program, wherein the at least one program is executable by the processor to perform the display method as defined in the embodiment of the present disclosure.

DETAILED DESCRIPTION

The visual system of human eyes is the best image processing system in the world, but it is far from being perfect. Visual perception of human eyes on images is non-uniform and non-linear, and not all changes in the images can be perceived.

When two black spots on the spatial plane are close to each other to a certain extent, observers at a certain distance from the black spots may not distinguish these spots, which means that the human eyes have limited abilities to distinguish the details of the scenery, and this limit value is the resolution. Research shows that the resolution of human eyes has the following characteristics: (1) when the background brightness is too strong or too weak, the resolution of the human eyes is reduced; and (2) the resolution of the human eyes on color details is poorer than that on brightness details, and if the resolution of black and white is 1, the resolution of black and red is 0.4 and the resolution of green and blue is 0.19. It shows that the human eyes have different resolutions on different grayscale levels. Generally, a higher grayscale level indicates a better resolution ability of the human eyes; otherwise, a smaller grayscale level indicates a poorer resolution ability of the human eyes.

Based on the above theory and according to the present disclosure, the grayscale levels of different regions are classified by dividing one frame of image into regions and extracting the grayscale level of each region after quantization. Different resolution display schemes are distributed to each grade of grayscale level. Thus, the transmission quantity of display data is reduced and the utilization of the transmission bandwidth is improved.

The present disclosure is described hereinafter in further detail with reference to the accompanying drawings and embodiments. It should be understood that the specific embodiments described herein are only intended to illustrate the relevant disclosure, other than limiting the present disclosure. In addition, it should be noted that, for ease of description, the accompanying drawings only show parts relevant to the present disclosure.

It should be noted that the embodiments of the present disclosure and the features in the embodiments may be combined with one another without any conflict. The present disclosure is described hereinafter in detail with reference to the accompanying drawings and embodiments.

Figure 1:
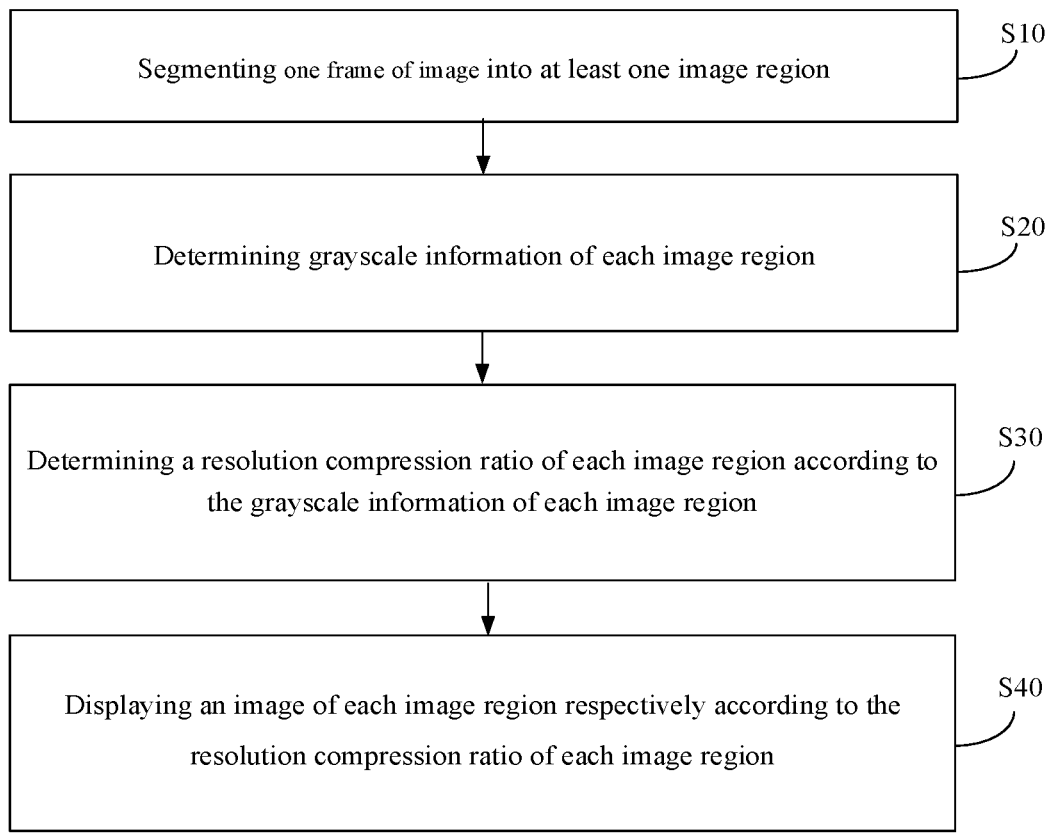
FIG. 1 shows an exemplary flowchart of a display method according to an embodiment of the present disclosure.
Figure 2:
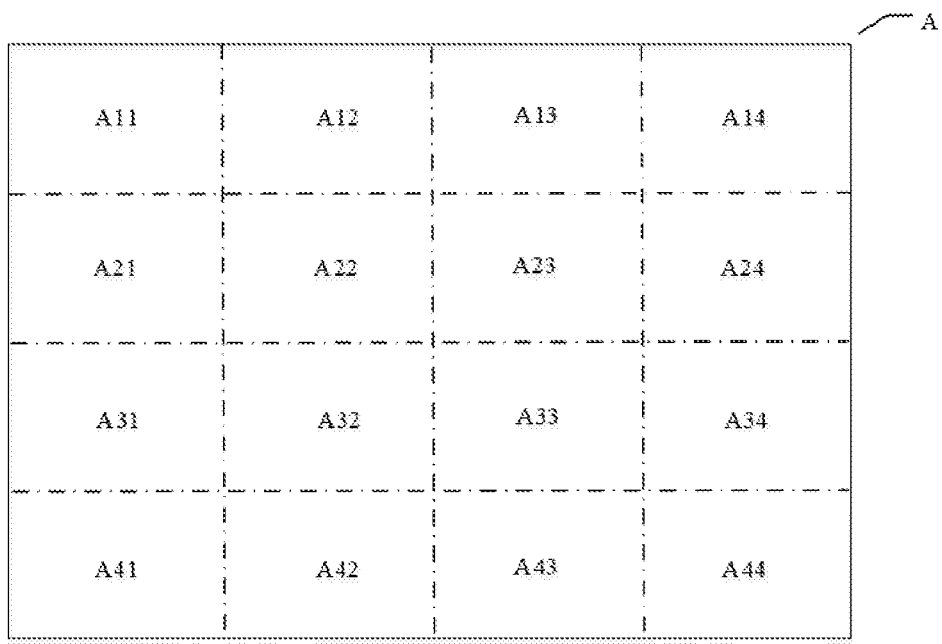
FIG. 2 shows an exemplary schematic diagram of image segmentation according to an embodiment of the present disclosure.

A display method of an image region is described hereinafter with reference to FIG. 1 and FIG. 2. FIG. 1 shows an exemplary flowchart of a display method according to an embodiment of the present disclosure. FIG. 2 shows an exemplary schematic diagram of image segmentation according to an embodiment of the present disclosure.

In step S10, one frame of image is segmented into at least one image region.

In step S20, grayscale information of each image region is determined.

In step S30, a resolution compression ratio of each image region is determined according to the grayscale information of each image region, wherein a grayscale level of the image region is negatively correlated with the resolution compression ratio.

Herein, negative correlation means that a higher grayscale level of the image region indicates a lower the resolution compression ratio. A relationship between the grayscale level and the resolution compression ratio of the image region may be linear, that is, the grayscale level is inversely proportional to the resolution compression ratio; or the relationship between the grayscale level and the resolution compression ratio of the image region may also be non-linear, which is not limited in the present disclosure.

In step S40, an image of each image region is displayed according to the resolution compression ratio of each image region.

According to the technical solution according to the embodiment of the present disclosure, the problem of lags in picture or dizziness caused by huge display data volume in the traditional display can be solved by determining the resolution compression ratio of each image region according to the grayscale information of each image region and displaying.

In step S10, one frame of image is segmented into a plurality of regions equidistantly according to rows and columns.

For example, one frame of image is segmented into a plurality of regions equidistantly according to rows and columns, and the plurality of regions are arranged in an array. As shown in FIG. 2, one frame of image A is divided into image regions in four columns and four rows, including 16 image regions from A11 to A44. In practice, the number of different rows and columns may be defined according to a size of the image, which is not described herein any further.

In step S20, GRB three-element separation is performed for the image A to determine the grayscale level of each pixel point. That is, the grayscale level of each pixel point is determined based on a grayscale level and a weight of each channel of each pixel point in the image. For example, each pixel point includes three elements R, G, and B, the grayscale levels of R, G, and B are obtained respectively, and the grayscale level (gray) of the pixel point is calculated according to the following formula:

$$Gray=0.30 \times R+0.59 \times G+0.11 \times B.$$

R represents a grayscale level of a red element in the pixel point, G represents a grayscale level of a green element in the pixel point, and B represents a grayscale level of a blue element in the pixel point; and 0.30, 0.59, and 0.11 are weights of channels of three colors R, G, and B respectively. For each image region, an average grayscale level of the image region may be determined as the grayscale information of the image region according to the grayscale level of each pixel point.

Herein, only the case where each pixel point includes RGB channels is taken as an example, and in other implementations, each pixel point may also include RGBW channels and the like.

The channel herein refers to a color channel, and a plurality of channels corresponding to subpixels on a display panel may be separated from each pixel point.

In some embodiments, for each image region, the highest grayscale level in the grayscale level of each pixel point serves as the grayscale information of the image region.

Herein, if the average grayscale level or highest grayscale level determined above is a non-integer, a rounding operation is performed to obtain an integer, and then the integer is used as the grayscale information of the image region.

In step S30, the grayscale grade of the grayscale level of the image and the resolution compression ratio of each grayscale grade are defined firstly.

The grayscale level herein is a gray. Each grayscale grade corresponds to a plurality of consecutive grayscale levels, and grayscale levels corresponding to all the grayscale grades include all the grayscale levels. For example, all the grayscale levels are grouped equally by all the grayscale grades. Grade information of the grayscale grade may be predefined and stored in a display device for use in the subsequent image display. For example, the image A is an image with a grayscale level of 0-255, 64 levels are defined as a grade, such that 256 grayscale levels are grouped into four grayscale grades: [0-63], [64-127], [128-191], and [192-255], which correspond respectively to a primary grayscale grade, a secondary grayscale grade, a tertiary grayscale grade, and a quaternary grayscale grade, and the corresponding resolution compression ratios are 4:1, 3:1, 2:1, and 1:1 respectively. In practice, different grayscale grades and resolution compression ratios may be defined according to the features of the image, which are not described herein any further.

In other implementations, all the grayscale levels may also be segmented by all the grayscale grades in an unequal manner, for example, 256 grayscale levels are grouped into four grayscale grades: [0-80], [81-140], [141-200], and [201-255].

Afterwards, the grayscale grade of the image region is determined according to the average grayscale information obtained in step S20, such that the resolution compression ratio of each image region is determined.

Exemplarily, step S30 may include: determining a grayscale grade of each image region according to grayscale information; and determining a resolution compression ratio corresponding to the grayscale grade of the image region according to a relationship between the grayscale grade and the resolution compression ratio.

In step S40, at a display stage, display data corresponding to the resolution compression ratio of the image region is output to pixel units in each column corresponding to each image region, wherein outputting the display data corresponding to the resolution compression ratio means outputting the same display data pixel units in at least two adjacent columns.

At the display stage, the current effective pixel row is selected by row scanning driving, and the corresponding display data is output to the effective pixel row by display driving. Therefore, display can be performed by outputting the same display data to pixel units in several adjacent columns.

Exemplarily, at the display stage, display data corresponding to the resolution compression ratio of the image region is output to pixel units in each column corresponding to the image region when pixel units in each row corresponding to the image region are scanned.

Outputting the display data corresponding to the resolution compression ratio of the image region to pixel units in each column corresponding to the image region may include: outputting the same display data to pixel units in at least two adjacent columns corresponding to the image region, wherein a higher grayscale of the image region indicates a smaller number of columns of pixel units outputting the same display data.

If the grayscale grade of the image region is the highest, the display data of the image region may not be compressed, and the display data is output respectively to pixel units in each column corresponding to the image region at this time.

Figure 3:
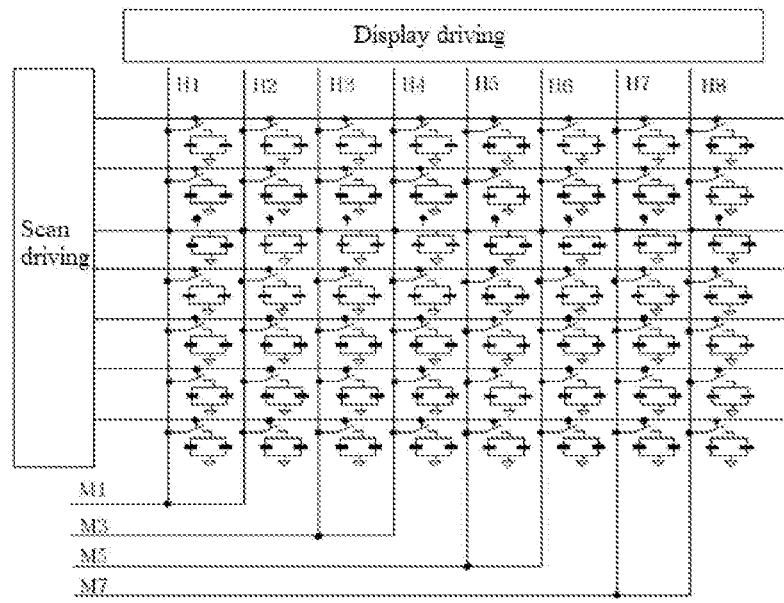
FIG. 3 shows an exemplary schematic diagram of display of an image region A11 with a resolution compression ratio of 1/2 according to the present disclosure.

FIG. 3 shows an exemplary schematic diagram of display of an image region A11 with a resolution compression ratio of 1/2 according to the present disclosure. As shown in FIG. 3, when the resolution compression ratio of the image region A11 is 2:1 and the image of the image region 11 is displayed in pixel units including seven rows and eight columns, the same display data is output to pixel units in each two adjacent columns according to the resolution compression ratio. Pixel column H1 and pixel column H2 have corresponding display data M1 and display data M2, one of display data M1 and display data M2 is output to pixel column H1 and pixel column H2 after compression, and M1 is selected to output as shown in FIG. 3. By this analogy, one of display data M3 and display data M4 is output to pixel column H3 and pixel column H4, and display data M3 is selected for output in FIG. 3; one display data of M5 and M6 is output to H5 pixel column and H6 pixel column, and M5 is selected for output as shown in FIG. 3; and one of display data M7 and display data M8 is output to pixel column H7 and pixel column H8, and display data M7 is selected for output as shown in FIG. 3. Therefore, the transmittable data volume is reduced by half during display driving. The utilization of bandwidth is effectively improved on the premise of not affecting user experience.

Figure 4:
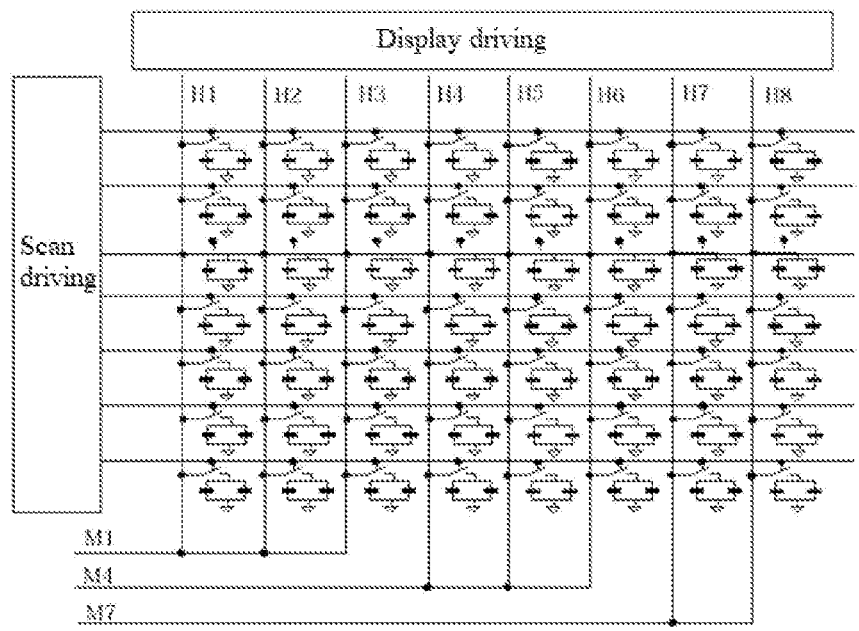
FIG. 4 shows an exemplary schematic diagram display of an image region A12 with a resolution compression ratio of 1/3 according to the present disclosure.

FIG. 4 shows an exemplary schematic diagram of display of an image region A12 with a resolution compression ratio of 1/3 according to the present disclosure. As shown in FIG. 4, when the resolution compression ratio of the image region A12 is 3:1 and the image of the image region 12 is displayed in pixel units, including seven rows and eight columns, the same display data is output to adjacent pixel units in each three adjacent columns according to the resolution compression ratio. Pixel column H1, pixel column H2, and pixel column H3 have corresponding display data M1, display data M2, and display data M3, one of display data M1, display data M2, and display data M3 is output to pixel column H1, pixel column H2, and pixel column H3 after compression, and display data M1 is selected for output as shown in FIG. 4, that is, the display data of pixel column H1, the display data of pixel column H2, and the display data of the pixel column H3 are the same. By this analogy, one of display data M4, display data M5, and display data M6 is output to pixel column H4, pixel column H5, and pixel column H6, and display data M4 is selected for output in FIG. 4. One of display data M7 and display data M8 is output to pixel column H7 and pixel column H8, and display data M7 is selected for output as shown in FIG. 4. Herein, only display data M7 is output from two pixel columns H7 and H8 due to a limitation to the number of the pixel columns. For one image region, if the number of columns of the total pixels is different, the number of a plurality of pixel columns finally outputting the same display data may be different. For example, if the image region only includes pixel columns H1 to H7, display data M7 is only output by pixel column H7. Therefore, the transmittable data volume is reduced by nearly ⅔ during display driving. The utilization of bandwidth is effectively improved on the premise of not affecting user experience.

The steps of the above method are to perform processing on each image region segmented from one frame of image; and in other implementations, the method may also be performed to part of image regions segmented from one frame of image, which can also reduce data transmission and improve the utilization of bandwidth.

The present disclosure further provides a display device.

Figure 5:
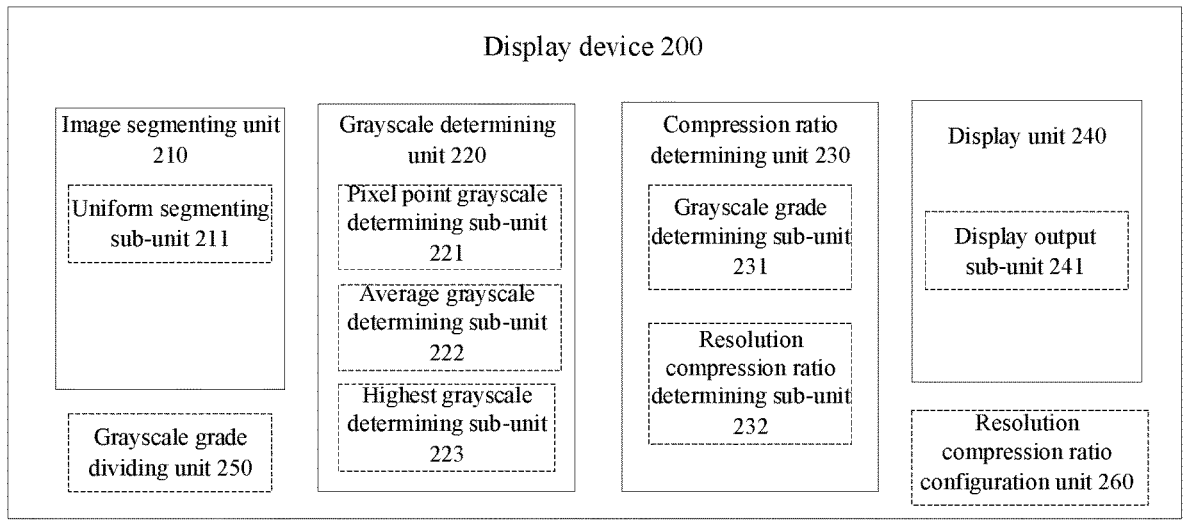
FIG. 5 shows an exemplary structural block diagram of a display device according to an embodiment of the present disclosure.

FIG. 5 shows an exemplary structural block diagram of a display device 200 according to an embodiment of the present disclosure. The display device includes:

an image segmenting unit 210, configured to segment one frame of image into at least one image region;

a grayscale determining unit 220, configured to determine grayscale information of each image region;

a compression ratio determining unit 230, configured to determine a resolution compression ratio of each image region according to the grayscale information of each image region, wherein a grayscale level of the image region is negatively correlated with the resolution compression ratio; and a display unit 240, configured to display an image of each image region according to the resolution compression ratio of each image region.

In some embodiments, the image segmenting unit 210 includes:

a uniform segmenting sub-unit 211, configured to segment one frame of image into a plurality of regions equidistantly according to rows and columns; for example, one frame of image is segmented into a plurality of regions equidistantly according to rows and columns, and the plurality of regions are arranged in an array.

In some embodiments, the grayscale determining unit 220 includes:

a pixel point grayscale determining sub-unit 221, configured to perform GRB three-element separation on the image and determine a grayscale level of each pixel point; for example, the grayscale level of each pixel point is determined based on a grayscale level and a weight of each channel of each pixel point of the image;

an average grayscale determining sub-unit 222, configured to determine an average grayscale level of the image region as gray information of the image region according to the grayscale level of each pixel point.

In some embodiments, the grayscale determining unit 220 includes:

a pixel point grayscale determining sub-unit 221, configured to perform GRB three-element separation for the image and determine a grayscale level of each pixel point; for example, the grayscale level of each pixel point is determined based on a grayscale level and a weight of each channel of each pixel point of the image; and a highest grayscale determining sub-unit 223, configured to take a highest grayscale level in the grayscale levels of the pixel points as the grayscale information of the image region.

In some embodiments, the compression ratio determining unit 230 includes:

a grayscale grade determining sub-unit 231, configured to determine a grayscale grade of each image region according to the grayscale information; and a resolution compression ratio determining sub-unit 231, configured to determine a resolution compression ratio corresponding to the grayscale grade of each image region according to a relationship between the grayscale grade and the resolution compression ratio.

In some embodiments, the display device further includes:

a grayscale grade classifying sub-unit 250, configured to classify the grayscale levels of the image into a plurality of grayscale grades; and a resolution compression ratio defining unit 260, configured to define a resolution compression ratio of each grayscale grade.

Exemplarily, each grayscale grade corresponds to a plurality of consecutive grayscale levels, and all grayscale levels are equally divided by all grayscale grades.

In some embodiments, the display unit 240 includes:

a display output sub-unit 241, configured to, at a display stage, output display data corresponding to the resolution compression ratio of the image region to pixel units in each columns corresponding to each image region, wherein outputting the display data corresponding to the resolution compression ratio means outputting the same display data to pixel units in at least two adjacent columns.

For example, the display output sub-unit is configured to, at the display stage, output display data corresponding to the resolution compression ratio of the image region to pixel units in each column corresponding to the image region when pixel units in each row corresponding to the image region are scanned.

The display output sub-unit is configured to output the same display data to pixel units in at least two adjacent columns corresponding to the image region, wherein a higher grayscale of the image region indicates a smaller number of columns of the pixel units outputting the same display data.

The device is practiced by processing each image region segmented from one frame of image; and in other implementations, the device may also process a part of image regions segmented from one frame of image, which may likewise reduce data transmission and improve the utilization of bandwidth.

The present disclosure also provides a virtual reality display device. The virtual reality display device includes a display device according to the embodiment of the present disclosure.

Figure 6:
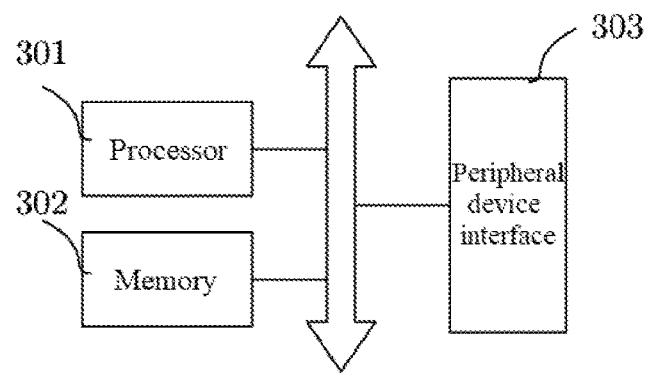
FIG. 6 is a structure block diagram of a virtual reality device 300 according to an embodiment of the present disclosure.

FIG. 6 is a structure block diagram of a virtual reality device 300 according to an embodiment of the present disclosure. Generally, the virtual reality device 300 includes: a processor 301 and a memory 302.

The processor 301 may include one or more processing cores, for example, a quad-core processor or an octa-core processor. The processor 301 may be practiced by adopting at least one hardware of digital signal processing (DSP), field-programmable gate array (FPGA) and programmable logic array (PLA). The processor 301 may also include a main processor and a co-processor. The main processor, also called central processing unit (CPU), is a processor for processing data in an awaken state; and the co-processor is a low-power-consumption processor for processing data in a standby state. In some embodiments, the processor 301 may be integrated with graphics processing unit (GPU). The GPU is used for rendering and drawing the content required to be displayed by the display screen. In some embodiments, the processor 301 may also include an artificial intelligence (AI) processor. The AI processor is used for processing computing operation related to machine learning.

The memory 302 may include one or more computer-readable storage media that may be non-transitory. The memory 302 may also include a high-speed random access memory and a non-volatile memory, such as one or more magnetic disk storage devices and flash memory storage devices. In some embodiments, the non-transitory computer-readable storage media in the memory 302 is configured to store at least one instruction. The at least one instruction may be executed by the processor 301 to perform the display method according to the embodiment of the present disclosure.

In some embodiments, the device 300 may optionally include: a peripheral device interface 303 and at least one peripheral device. The processor 301, the memory 302, and the peripheral device interface 303 may be connected by a bus or a signal line. Each peripheral device may be connected to the peripheral device interface 303 by a bus, a signal line, or a circuit board.

It may be understood by those skilled in the art that the structure shown in FIG. 6 is not a limitation to the device 300, and the device may include more or less components than those in the figure, or a combination of some components, or different component layouts.

As another aspect, the present disclosure further provides a computer-readable storage medium. The computer-readable storage medium may be a computer-readable storage medium included in the device according to the above embodiment, and may further be a computer-readable storage medium that exists separately and is not assembled in the device. The computer-readable storage medium has one or more than one program. The program is used by one or more than one processor to execute a training method described in a text classification model of the present disclosure, or the program is used by at least one processor to execute a display method described in the present disclosure.

The flowcharts and the block diagrams in the accompanying drawings show system architectures, functions and operations, which may be realized, of systems, methods and computer program products according to various embodiments of the present disclosure. At this point, each block in the flowcharts or the block diagrams may represent a module, a program segment or one part of a code, wherein the module, the program segment or one part of the code includes at least one executable instruction for implementing specified logical functions. It should be noted that, in some alternative implementations, and functions marked in the block may also occur in a different order than that marked in the accompanying drawings. For example, two blocks shown in succession may be executed substantially in parallel, and may sometimes be executed in an opposite order, depending on the functions involved. It should also be noted that, each block in the block diagrams and/or the flowcharts as well as combination of blocks in the block diagrams and/or flowcharts may be implemented by a special system which executes the specified function or operation based on hardware, or may be implemented by a combination of special hardware and computer instructions.

Described above are merely interpretations of embodiments of the present disclosure and the applied technical principles. It should be understood by those skilled in the art that, the protection scope of the present disclosure is not limited to the technical solutions constructed by a specific combination of the above technical features, and should cover other technical solutions constituted by any combination of the above technical features or the equivalent features thereof without departing from the inventive concept of the present disclosure, for example, the technical solutions derived by inter-replacements of the above features and the technical features with (but not limited to) similar functions disclosed by the present disclosure.

What is claimed is:
1. A display method, comprising:
segmenting one frame of image into at least one image region;
determining grayscale information of the image region;
determining a resolution compression ratio of the image region according to the grayscale information of the image region, wherein a grayscale level of the image region is negatively correlated with the resolution compression ratio; and displaying an image of the image region according to the resolution compression ratio of the image region, wherein displaying the image of the image region according to the resolution compression ratio of the image region comprises:

at a display stage, outputting display data corresponding to the resolution compression ratio of the image region to pixel units in each column corresponding to the image region by: outputting the same display data to pixel units in at least two adjacent columns corresponding to the image region when pixel units in each row corresponding to the image region are scanned, wherein a higher grayscale of the image region indicates a smaller number of columns of the pixel units outputting the same display data.

2. The display method according to claim 1, wherein determining the grayscale information of the image region comprises:

determining a grayscale level of each pixel point based on a grayscale level and a weight of each channel of a pixel point in the image region; and determining an average grayscale level of the image region as the grayscale information of the image region according to the grayscale level of each pixel point.

3. The display method according to claim 1, wherein determining the grayscale information of the image region comprises:

determining a grayscale level of each pixel point based on a grayscale level and a weight of each channel of a pixel point in the image region; and taking a highest grayscale level in the grayscale levels of the pixel points as the grayscale information of the image region.

4. The display method according to claim 1, wherein determining the resolution compression ratio of the image region according to the grayscale information of the image region comprises:

determining a grayscale grade of the image region according to the grayscale information;

acquiring a relationship between different grayscale grades and resolution compression ratios; and determining a resolution compression ratio corresponding to the grayscale grade of the image region based on the determined grayscale grade of the image region and the relationship as acquired.

5. The display method according to claim 4, wherein each grayscale grade corresponds to a plurality of consecutive grayscale levels.

6. The display method according to claim 1, wherein segmenting the one frame of image into the at least one image region comprises:

segmenting one frame of image into a plurality of regions equidistantly according to rows and columns, wherein the plurality of regions are arranged in an array.

7. A virtual reality device, comprising: a processor; and a memory configured to store at least one computer instruction; wherein the processor is configured to perform the display method as defined in claim 1 when executing the at least one computer instruction.

8. A non-transitory computer-readable storage medium storing at least one computer program, wherein the at least one program is executable by the processor to perform the display method as defined in claim 1.

9. A display device, comprising: a processor; and a memory configured to store at least one computer instruction; wherein the processor is configured to:

segment one frame of image into at least one image region;

determine grayscale information of the image region;

determine a resolution compression ratio of the image region according to the grayscale information of the image region, wherein a grayscale level of the image region is negatively correlated with the resolution compression ratio; and display an image of the image region according to the resolution compression ratio of the image region, wherein displaying the image of the image region according to the resolution compression ratio of the image region comprises:

at a display stage, outputting display data corresponding to the resolution compression ratio of the image region to pixel units in each column corresponding to the image region by: outputting the same display data to pixel units in at least two adjacent columns corresponding to the image region when pixel units in each row corresponding to the image region are scanned, wherein a higher grayscale of the image region indicates a smaller number of columns of the pixel units outputting the same display data.

10. The display device according to claim 9, wherein in order to determine the grayscale information of the image region, the processor is further configured to:

determine a grayscale level of each pixel point based on a grayscale level and a weight of each channel of a pixel point in the image region; and determine an average grayscale level of the image region as grayscale information of the image region according to the grayscale level of each pixel point.

11. The display device according to claim 9, wherein in order to determine the grayscale information of the image region, the processor is further configured to:

determine a grayscale level and a weight of each pixel point based on a grayscale level of each channel of a pixel point in the image region; and take a highest grayscale level in the grayscale levels of the pixel points as the grayscale information of the image region.

12. The display device according to claim 9, wherein in order to determine the resolution compression ratio of the image region according to the grayscale information of the image region, the processor is further configured to:

determine a grayscale grade of the image region according to the grayscale information;

acquiring a relationship between different grayscale grades and resolution compression ratios; and determining a resolution compression ratio corresponding to the grayscale grade of the image region based on the determined grayscale grade of the image region and the relationship as acquired.

13. The display device according to claim 12, wherein each grayscale grade corresponds to a plurality of consecutive grayscale levels, and grayscale levels corresponding to all the grayscale grades comprise all the grayscale levels.

14. The display device according to claim 9, wherein in order to segment the one frame of image into the at least one image region, the processor is further configured to:

segment one frame of image into a plurality of regions equidistantly according to rows and columns, wherein the plurality of regions are arranged in an array.

15. A virtual reality display device, comprising the display device as defined in claim 9.

\* \* \* \* \*